United States Patent
Nukariya

(10) Patent No.: US 12,346,779 B2
(45) Date of Patent: Jul. 1, 2025

(54) INFORMATION PROCESSING DEVICE, MACHINE LEARNING METHOD, AND NON-TRANSITORY COMPUTER-READABLE STORAGE MEDIUM FOR STORING MACHINE LEARNING PROGRAM OF CONVERTING DATA TYPE SO THAT EFFICIENCY OF DEEP LEARNING IS IMPROVED

(71) Applicant: FUJITSU LIMITED, Kawasaki (JP)

(72) Inventor: Atsushi Nukariya, Kawagoe (JP)

(73) Assignee: Fujitsu Limited, Kawasaki (JP)

( * ) Notice: Subject to any disclaimer, the term of this patent is extended or adjusted under 35 U.S.C. 154(b) by 1020 days.

(21) Appl. No.: 17/343,805

(22) Filed: Jun. 10, 2021

(65) Prior Publication Data

US 2022/0058521 A1 Feb. 24, 2022

(30) Foreign Application Priority Data

Aug. 19, 2020 (JP) .................................. 2020-138823

(51) Int. Cl.
*G06N 20/00* (2019.01)
(52) U.S. Cl.
CPC .................................. *G06N 20/00* (2019.01)
(58) Field of Classification Search
CPC .......... G06N 20/00; G06N 3/063; G06N 3/04; G06N 3/08
See application file for complete search history.

(56) References Cited

U.S. PATENT DOCUMENTS

| 2018/0322607 A1 | 11/2018 | Mellempudi et al. |
| 2019/0294438 A1 | 9/2019 | Wang et al. |
| 2019/0339939 A1 | 11/2019 | Ito et al. |
| 2019/0340214 A1 | 11/2019 | Gudovskiy et al. |
| 2020/0193274 A1* | 6/2020 | Darvish Rouhani .. G06N 3/045 |

(Continued)

FOREIGN PATENT DOCUMENTS

| JP | 2018-124681 A | 8/2018 |
| JP | 2018-181313 A | 11/2018 |

(Continued)

OTHER PUBLICATIONS

Menard et al., "Floating-to-Fixed-Point Conversion for Digital Signal Processors" (Year: 2006).*

(Continued)

*Primary Examiner* — Alan Chen
(74) *Attorney, Agent, or Firm* — Fujitsu Intellectual Property Center

(57) ABSTRACT

A method including: determining a data type to be used for each of a plurality of operations, the plurality of operations being a series of operations to be used in machine learning processing; reducing a total processing time by modifying the determined data type to be used in each of the operations to a data type that is more accurate than the data type defined by the determining, the total processing time being a time period including an operation time for each of the plurality of operations and a conversion time taken to convert the data type; and executing each of the plurality of operations by using the modified data type of each of the plurality of operations.

4 Claims, 9 Drawing Sheets

(56) References Cited

U.S. PATENT DOCUMENTS

2021/0150685 A1   5/2021  Chen et al.

FOREIGN PATENT DOCUMENTS

JP     2019-169150 A    10/2019
WO    2019/085655 A1    5/2019

OTHER PUBLICATIONS

Nandakumar, S. R. et al., "Mixed-Precision Deep Learning Based on Computational Memory", Frontiers in Neuroscience, [Online], vol. 14, May 12, 2020, 43 pages, XP055866185, Retrieved from the Internet: URL:https://www.frontiersin.org/articles/10.3389/fnins.2020.00406/full#/h9> [retrieved on Nov. 26, 2021].

Extended European Search Report dated Dec. 7, 2021 for corresponding European Patent Application No. 21177844.4, 13 pages.

European Office Action dated Sep. 17, 2024 for corresponding European Patent Application No. 21177844.4, 9 pages.

* cited by examiner

FIG. 6

| OPERATION NAME | OPERATION TIME WHEN OPERATION IS PERFORMED WITH 32-BIT FLOATING-POINT NUMBER [ms] | OPERATION TIME WHEN OPERATION IS PERFORMED WITH 8-BIT FIXED-POINT NUMBER |
|---|---|---|
| Add0 | 1.5 | 0.8 |
| Conv0 | 10.6 | 8.2 |
| NatchNorm0 | 3.4 | 1.8 |
| MaxPool0 | 5.3 | 2.5 |
| Conv1 | 8.6 | 2.3 |
| Conv2 | 2.3 | 1.1 |
| MaxPool1 | 1.2 | 0.7 |
| ... | ... | ... |

| OPERATION DATA CONVERSION | CONVERSION TIME FROM 32-BIT FLOATING-POINT NUMBER TO 8-BIT FIXED-POINT NUMBER | CONVERSION TIME FROM 8-BIT FIXED-POINT NUMBER TO 32-BIT FLOATING-POINT NUMBER |
|---|---|---|
| Add0-Conv0 | 0.5 | 1.2 |
| BatchNorm0-Conv0 | 1.0 | 1.8 |
| Conv0-MaxPool0 | 0.8 | 1.2 |
| MaxPool0-Conv1 | 0.9 | 1.5 |
| Conv2-MaxPool1 | 0.8 | 1.4 |
| ... | ... | ... |

# INFORMATION PROCESSING DEVICE, MACHINE LEARNING METHOD, AND NON-TRANSITORY COMPUTER-READABLE STORAGE MEDIUM FOR STORING MACHINE LEARNING PROGRAM OF CONVERTING DATA TYPE SO THAT EFFICIENCY OF DEEP LEARNING IS IMPROVED

CROSS-REFERENCE TO RELATED APPLICATION

This application is based upon and claims the benefit of priority of the prior Japanese Patent Application No. 2020-138823, filed on Aug. 19, 2020, the entire contents of which are incorporated herein by reference.

FIELD

The embodiment discussed herein is related to an information processing device, a machine learning method, and a non-transitory computer-readable storage medium storing a machine learning program.

BACKGROUND

In cent years, a variety of companies have been working on the development of processors optimized for deep learning. The same is true for machine learning. Deep learning is one approach for machine learning.

The operations used in deep learning are mainly tensor operations, and are characterized in that deviations in the value of each element of a tensor becomes smaller as the learning progresses. Focusing on such special properties of many operations performed in deep learning, processors designed for deep learning, such as processors that perform inference operations with 8-bit integers, have been released. Normally, when an operation is performed using the 8-bit or 16-bit fixed-point number, the operation time may be shortened.

These processors are expected to improve power-to-operation performance by performing operations with low operation accuracy. However, since the operation accuracy of the existing processor is predetermined by the hardware, the characteristics of the operation performed in deep learning that variations in each element of the tensor becomes smaller as the learning progresses is not fully utilized. Furthermore, even the operation used in deep learning has a disadvantage that learning sometimes does not progress depending on the operation if the operation accuracy is lowered. It is difficult to specify such an operation.

Thus, there is a technique for determining whether to perform an operation with 32-bit floating point or 8-bit fixed point, according to the contents of the operation. However, among the operations performed in one iteration in deep learning, there are some operations in which changes in each element of the tensor becomes greater even after the learning has progressed to some extent. In such an operation in which changes in each element becomes greater in the middle, when the operation accuracy is lowered in advance according to the contents of the operation, there is a possibility that it becomes difficult to perform a precise operation.

Note that, as a technique of arithmetic processing in deep learning, there is a prior art technique that precomputes each element of an input tensor to convert the operation into the form of expression of a power of two, and performs an operation by addition and shift operation using a weight tensor for a convolution operation and the input tensor. Furthermore, there is a prior art technique that acquires statistical information about the distribution of bits as a result of executing a command for data having a fixed-point number, and updates the decimal point position of the fixed-point number. In addition, there is a prior art technique that identifies a first operation from a series of operations, selects a second operation to be grouped with the first operation, and processes input data by the grouped operations.

Examples of the related art include Japanese Laid-open Patent Publication No. 2018-181313, Japanese Laid-open Patent Publication No. 2018-124681, and Japanese Laid-open Patent Publication No. 2019-169150.

However, when the 32-bit floating-point number is converted into the 16-bit or 8-bit fixed-point number and vice versa, a delay is produced due to data type conversion. Therefore, when an operation is performed after the 32-bit floating-point number is converted into the 8-bit fixed-point number and then a process such as returning to the 32-bit floating-point number again is performed, the operation time is not necessarily shortened at every time and the processing time is not guaranteed to be reduced. For example, there is a case where it takes time to convert the data type, and when viewed in total, a higher-speed operation is enabled by performing a process using the 32-bit floating-point number. In this manner, when attention is paid to the individual operation and the data type is determined for each operation such that the local processing time is shortened, there is a possibility that it becomes difficult to keep the processing time for the entire deep learning minimum Therefore, it becomes difficult to improve the efficiency of deep learning. Here, since power is consumed and operation resources are secured to perform the operation within the processing time, the cost pertaining to the operation can be deemed to be proportional to the processing time, and the processing time is thus sometimes called the operation cost.

Furthermore, even with the prior art technique that performs an operation by addition and shift operation using the weight tensor for a convolution operation and the input tensor, the efficiency of each operation may be improved, but it is difficulty to keep the processing time for the entire deep learning short. In addition, even in the prior art technique that updates the decimal point position of the fixed-point number based on statistical information about the distribution of bits as a result of executing the command, the processing time for the entire deep learning is not considered, and it is difficult to keep the processing time short. Likewise, even in the prior art technique that groups a series of operations to process input data, it is difficult to keep the processing time for the entire deep learning short because a delay due to data type conversion is not considered. Accordingly, it is difficult to improve the efficiency of deep learning by any of the prior art techniques.

In an aspect of the embodiments disclosed below, there is provided a solution to improve the efficiency of deep learning.

SUMMARY

According to an aspect of the embodiments, an information processing device includes: a memory; and a processor coupled to the memory, the processor being configured to perform processing, the processing including: determining a data type to be used for each of a plurality of operations, the plurality of operations being a series of operations to be used in machine learning processing; reducing a total processing time by modifying the determined data type to be used in each of the operations to a data type that is more accurate than the data type defined by the determining, the total processing time being a time period including an operation time for each of the plurality of operations and a conversion time taken to convert the data type; and executing each of the plurality of operations by using the modified data type of each of the plurality of operations.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram representing an example of an operation ti management table and a conversion time management table;

DESCRIPTION OF EMBODIMENTS

Embodiments of an information processing device, a machine learning method, and a machine learning program disclosed in the present application will be described in detail below on the basis of the drawings. Note that the following embodiments do not limit the information processing device, the machine learning method, and the machine learning program disclosed in the present application.

First Embodiment

Figure 1:
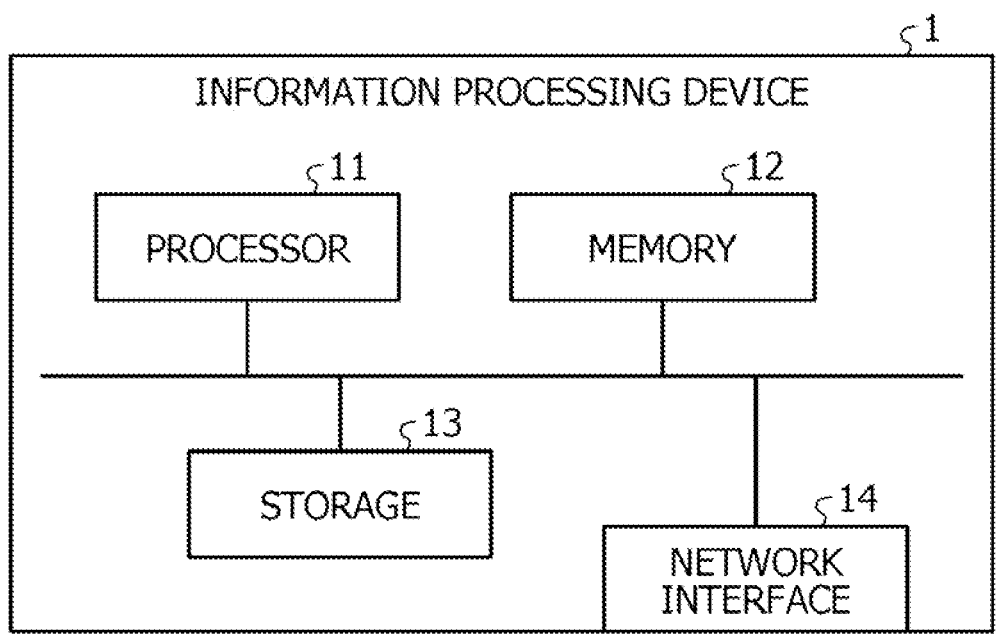
FIG. 1 is a hardware configuration diagram of an information processing device.

FIG. 1 is a hardware configuration diagram of an information processing device. An information processing device 1 executes deep learning. The information processing device 1 that executes deep learning will be described below. However, the information processing device 1 has a similar function also when executing another kind of machine learning. There is a case where the information processing device 1 is referred to as a node. As illustrated in FIG. 1, the information processing device 1 includes a processor 11, a memory 12, a storage 13, and a network interface 14.

For example, a central processing unit (CPU) or a graphics processing unit (GPU) may be used as the processor 11. The processor 11 is connected to the memory 12, the storage 13, and the network interface 14 via a bus. The processor 11 executes various operations including operations in deep learning.

The memory 12 is a volatile memory. The memory 12 temporarily holds data for learning read from the storage 13 until the data is transferred to the processor 11. Furthermore, the memory 12 holds various kinds of data used for arithmetic processing executed by the processor 11.

The storage 13 is a nonvolatile memory such as a hard disk drive (HDD) or a solid state drive (SSD). The storage 13 stores learning data used when deep learning is executed by the information processing device 1.

The network interface 14 is an interface to connect to another information processing device 1 by way of Ethernet (registered trademark) or InfiniBand (registered trademark). The network interface 14 relays transmission and reception of data between the processor 11 and a processor 11 mounted in another information processing device 1.

Figure 2:
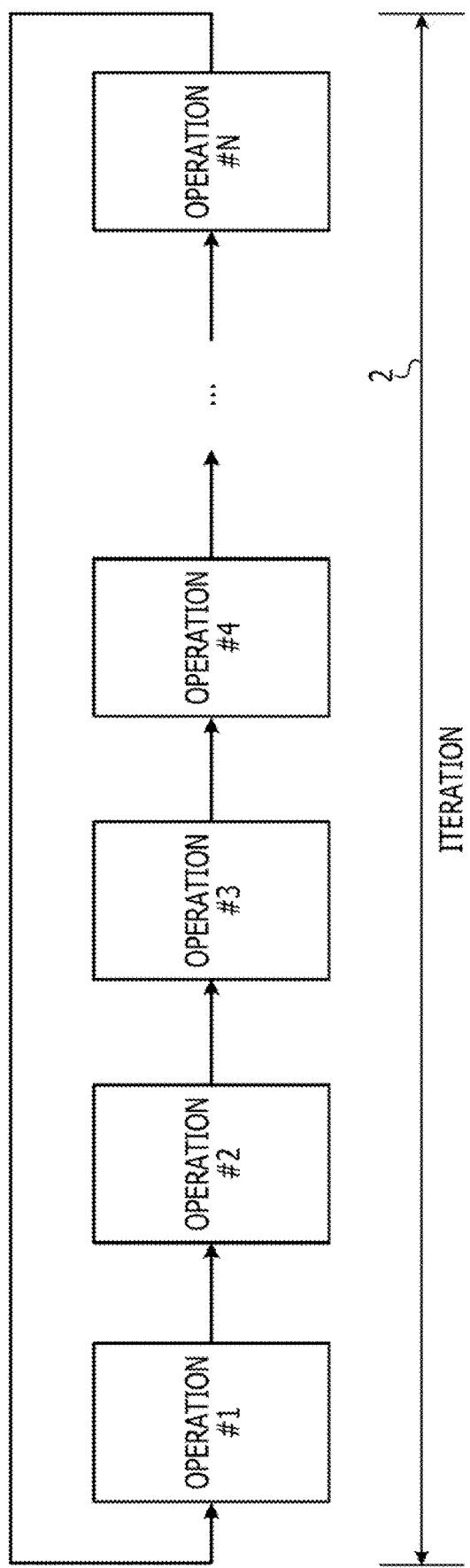
FIG. 2 is a diagram for explaining a course of learning.

The information processing device 1 performs deep learning using a multilayer neural network as illustrated in FIG. 2. FIG. 2 is a diagram for explaining a course of learning. The information processing device 1 enhances the recognition accuracy by repeating operations in respective layers. For example, as illustrated in FIG. 2, in a case where operations #1 to #N are performed separately in the respective layers, the information processing device 1 repeats the operations #1 to #N using learning data. Here, as illustrated in FIG. 2, a learning period 2 in which the operations #1 to #N are executed once in the repetition is referred to as an iteration. For example, the information processing device 1 completes deep learning by repeating the iteration a plurality of times.

Figure 3:
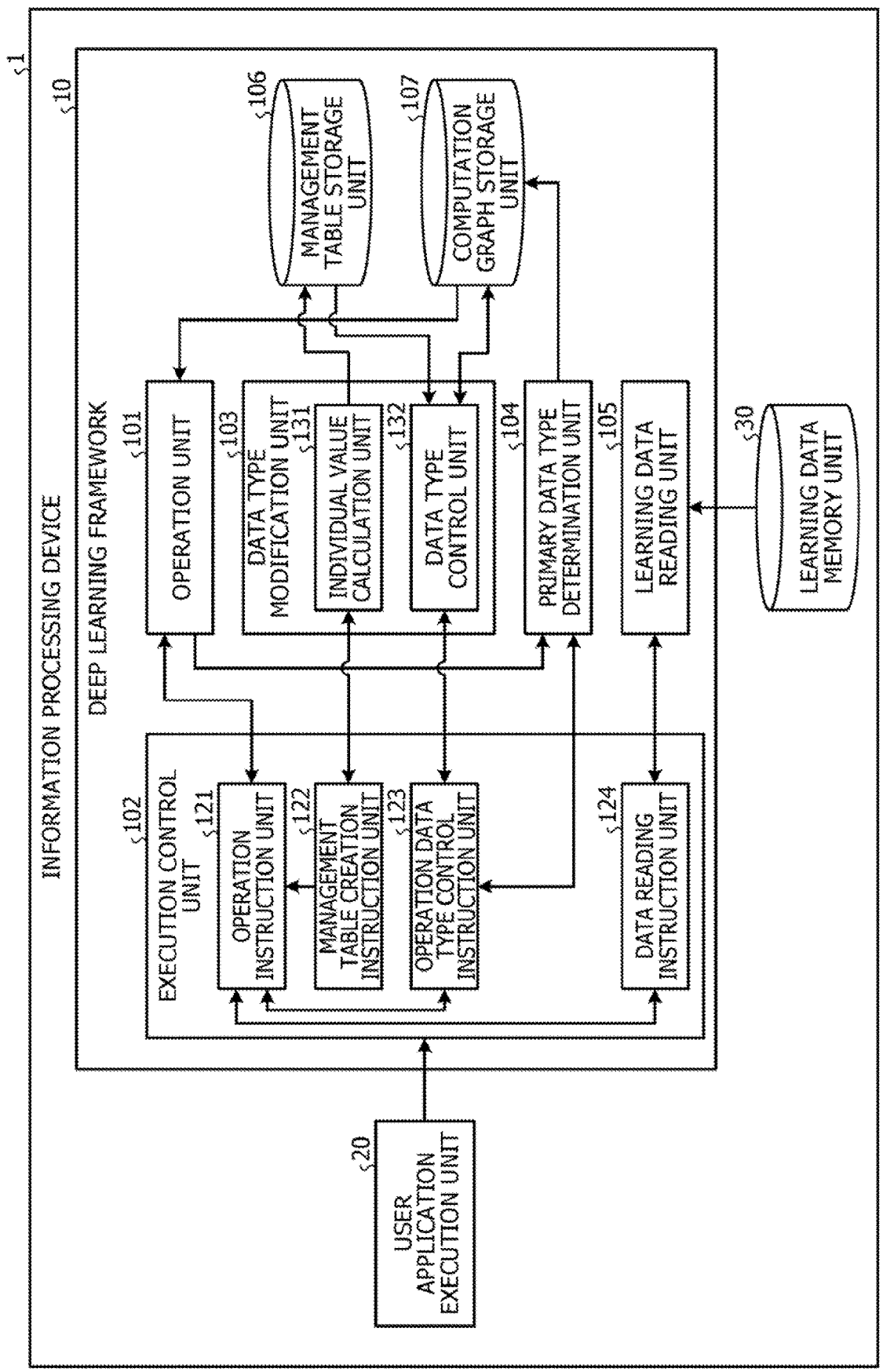
FIG. 3 is a block diagram of the information processing device according to an embodiment.

Next, the function of deep learning provided in the information processing device 1 according to the present embodiment will be described with reference to FIG. 3. FIG. 3 is a block diagram of the information processing device according to the embodiment.

As illustrated in FIG. 3, the information processing device 1 includes a deep learning framework 10, a user application execution unit 20, and a learning data memory unit 30. The learning data memory unit 30 is implemented by, for example, the storage 13 illustrated in FIG. 1. The learning data memory unit 30 stores a plurality of pieces of learning data used in deep learning in advance.

The user application execution unit 20 activates a deep learning application created by an operator, by reading and executing a user program input in advance. Then, the user application execution unit 20 outputs an execution command for deep learning designated by the activated user application to an execution control unit 102.

The deep learning framework 10 is a software library group developed to easily create a deep learning application. The deep learning framework 10 is implemented by the processor 11 and the memory 12 illustrated in FIG. 1. The deep learning framework 10 includes an operation unit 101, the execution control unit 102, a data type modification unit 103, a primary data type determination unit 104, a learning data reading unit 105, a management table storage unit 106, and a computation graph storage unit 107.

The computation graph storage unit 107 holds a computation graph that graphs the course of respective operations included in one iteration. The computation graph has a node that represents each operation, and the operation contents and the data type to be used are registered for each node. Thereafter, the primary data type determination unit 104 tentatively registers the data type of each operation to the computation graph held by the computation graph storage unit 107. Next, the tentatively registered data type is modified by a data type control unit 132 of the data type modification unit 103, and then the data type of each operation is registered in the computation graph storage unit 107.

Figure 4:
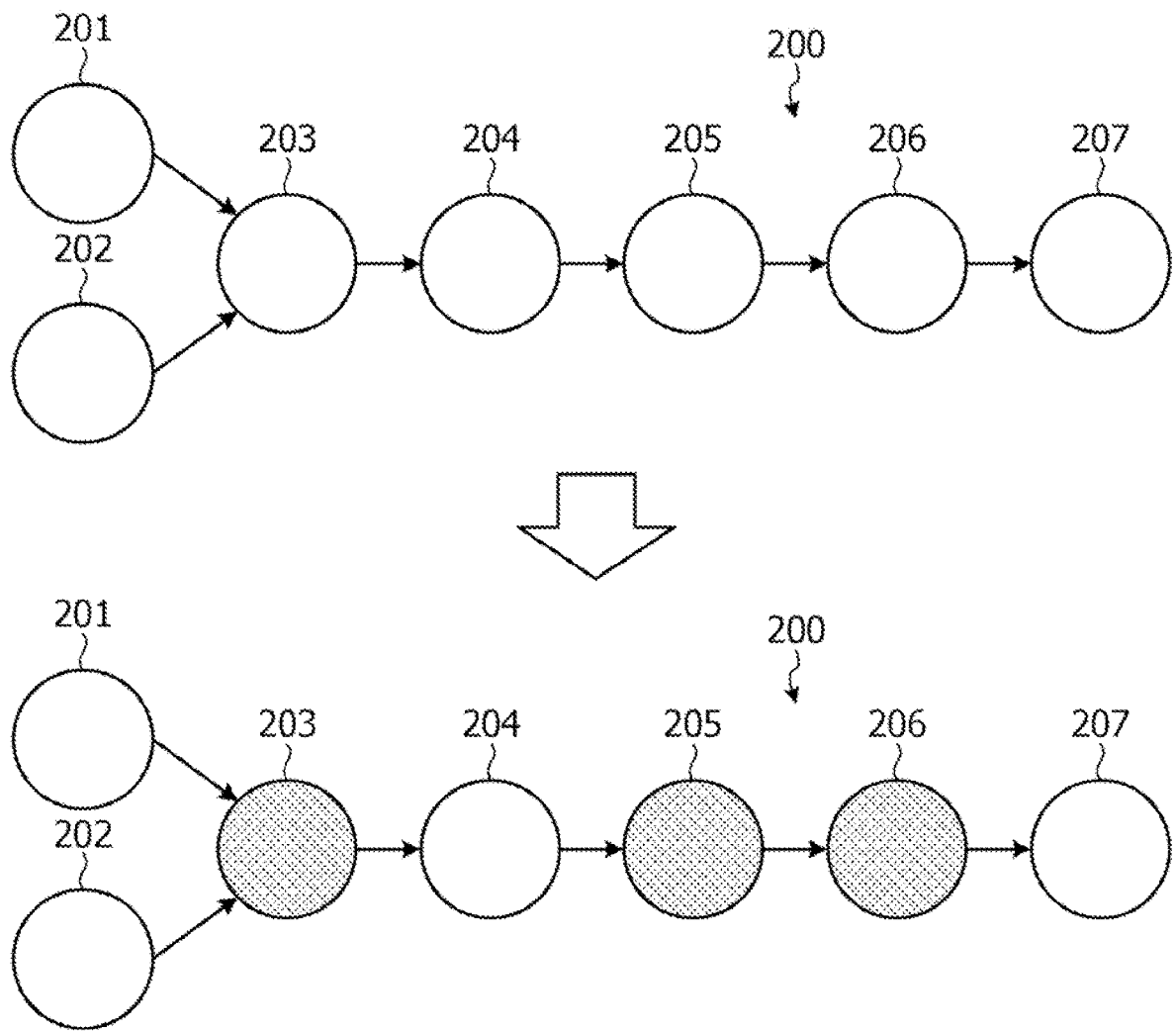
FIG. 4 is a diagram illustrating example of a computation graph.

FIG. 4 is a diagram illustrating an example of the computation graph. A computation graph 200 illustrated in FIG. 4 includes seven operations indicated by nodes 201 to 207. Information on the operations executed by the nodes 201 to 207 is registered in the computation graph 200. For example, the node 203 executes an operation in which the operation results of the nodes 201 and 202 are designated as inputs, and the result of the operation is employed as an input of the node 204.

The computation graph 200 in a state in which the data type to be used in each operation is not registered is registered in the computation graph storage unit 107 according to deep learning to be executed. For example, the user application execution unit 20 may register the computation graph in the computation graph storage unit 107 according to deep learning to be executed, together with the deep learning execution instruction.

The operation unit 101 executes an operation designated as a deep learning operation to perform deep learning. The operation unit 101 receives an input of learning data from an operation instruction unit 121 of the execution control unit 102 at the start of each iteration. Thereafter, the operation unit 101 receives an operation execution instruction from the operation instruction unit 121 of the execution control unit 102. Then, the operation unit 101 reads out the computation graph stored in the computation graph storage unit 107 to execute the operations in accordance with the computation graph using the learning data as an input, and ends one iteration. When all the operations included in one iteration are completed, the operation unit 101 outputs an iteration completion notification to the operation instruction unit 121. The operation unit 101 repeats the arithmetic processing until receiving a notification of the deep learning completion from the operation instruction unit 121.

The execution control unit 102 comprehensively controls various processes in deep learning. The execution control unit 102 includes the operation instruction unit 121, a management table creation instruction unit 122, an operation data type control instruction unit 123, and a data reading instruction unit 124.

The operation instruction unit 121 receives an instruction to start deep learning from the management table creation instruction unit 122. Then, the operation instruction unit 121 starts deep learning operation. The operation instruction unit 121 performs the following processes at the start of each iteration in deep learning.

The operation instruction unit 121 outputs an acquisition request for learning data to be used for learning, to the data reading instruction unit 124. Then, the operation instruction unit 121 receives an input of the learning data from the data reading instruction unit 124 as a response to the acquisition request.

Next, the operation instruction unit 121 instructs the operation data type control instruction unit 123 to execute an operation data type determination process. Thereafter, the operation instruction unit 121 receives a notification of the data type determination from the operation data type control instruction unit 123. Then, the operation instruction unit 121 outputs the learning data to the operation unit 101, and instructs the operation unit 101 to execute the operation.

Thereafter, the operation instruction unit 121 receives an input of the iteration completion notification from the operation unit 101. Then, the operation instruction unit 121 repeats the processes of acquiring the learning data, giving the execution instruction for the operation data type determination process, and causing the operation unit 101 to execute the operation.

The operation instruction unit 121 causes the operation unit 101 to repeat the operations in respective layers for each iteration until deep learning is completed. Here, in a case where a predetermined condition is satisfied, for example, in a case where a predetermined number of iterations end or in a case where the recognition accuracy exceeds 90%, the operation instruction unit 121 verifies that deep learning is completed. The recognition accuracy is acquired by performing a recognition process using test data each time when a prescribed number of iterations are completed. When it is verified that deep learning is completed, the operation instruction unit 121 sends a notification of the deep learning completion to the operation unit 101.

The management table creation instruction unit 122 acquires the deep learning execution instruction input to the execution control unit 102 from the user application execution unit 20. Then, the management table creation instruction unit 122 instructs an individual value calculation unit 131 of the data type modification unit 103 to calculate the operation time taken to execute each operation included in one iteration and the conversion time taken to convert the operation data. Thereafter, the management table creation instruction unit 122 receives a management table creation completion response from the individual value calculation unit 131. Then, the management table creation instruction unit 122 instructs the operation instruction unit 121 to start deep learning.

The operation data type control instruction unit 123 receives an instruction to execute the operation data type determination process, from the operation instruction unit 121. Then, the operation data type control instruction unit 123 instructs the primary data type determination unit 104 to execute a data type primary determination process. Here, the data type primary determination is a process of tentatively determining a data type deemed to be optimum for each operation, in consideration of the state of the operation result for each operation.

Thereafter, the operation data type control instruction unit 123 receives a notification of the tentative determination of the data type of each operation from the primary data type determination unit 104. Next, the operation data type control instruction unit 123 instructs the data type control unit 132 of the data type modification unit 103 to modify the data type. Thereafter, the operation data type control instruction unit 123 receives a notification of the conclusion for the data type from the data type control unit 132. Then, the operation data type control instruction unit 123 sends a notification of the data type determination to the operation instruction unit 121.

The data reading instruction unit 124 receives the acquisition request for the learning data to be used for learning from the operation instruction unit 121. Then, the data reading instruction unit 124 instructs the learning data reading unit 105 to read the learning data to be used for learning. Thereafter, the data reading instruction unit 124 acquires the learning data to be used for learning from the learning data reading unit 105. Then, the data reading instruction unit 124 outputs the acquired learning data to the operation instruction unit 121.

Subsequently, the data reading instruction unit 124 receives the acquisition request for the learning data from the operation instruction unit 121 each time when the iteration ends. Then, the data reading instruction unit 124 instructs the learning data reading unit 105 to read the learning data to acquire the learning data, and outputs the acquired learning data to the operation instruction unit 121 for each iteration.

The learning data reading unit 145 receives an instruction to read the learning data to be used for learning from the data reading instruction unit 124. Then, the learning data reading unit 105 reads the designated learning data from the learning data memory unit 30. Thereafter, the learning data reading unit 105 transmits the read learning data to the data reading instruction unit 124.

The primary data type determination unit 104 receives the execution instruction for the data type primary determination process from the operation data type control instruction unit 123. Then, the primary data type determination unit 104 acquires the operation result of each operation in the immediately preceding iteration from the operation unit 101. Additionally, the primary data type determination unit 104 calculates an expressible ratio, which is the ratio of the number of tensor elements that are expressible using 8-bit fixed point in an operation using 32-bit floating point as the data type, from the decimal point position determined in the operation result of each operation. Next, the primary data type determination unit 104 works out a fluctuation of each iteration, which represents variations in the expressible ratio, for an operation in which the calculated expressible ratio exceeds a threshold value. Subsequently, the primary data type determination unit 104 verifies whether or not the calculated fluctuation is less than a fluctuation threshold value. When the fluctuation is less than the fluctuation threshold value, the primary data type determination unit 104 verifies that the decimal point position of the relevant operation is converging, and accordingly primarily determines the operation data type of the relevant operation as the 8-bit fixed-point number. Here, the explanation is given to the case of conversion to 8-bit fixed point, but also in the case of conversion to another low-accurate data type with a decreased amount of information, such as 16-bit fixed point, the primary data type determination unit 104 may primarily determine the data type of each operation similarly.

Thereafter, the primary data type determination unit 104 registers the primarily determined data type of each operation in the computation graph held by the computation graph storage unit 107, and updates data type information in the computation graph to be used for each operation. With this process, as illustrated in the lower part of FIG. 4 when viewed facing the page, the data type used in each of the nodes 201 to 207 is registered in the computation graph 200. In FIG. 4, the primary data type determination unit 104 tentatively determines that the 8-bit fixed-point number is used as the data type at the nodes 203, 205, and 206 represented by the filled circles. Furthermore, the primary data type determination unit 104 tentatively determines that the 32-bit floating-point number is used at the nodes 201, 202, 204, and 207. Thereafter, the primary data type determination unit 104 outputs a notification of the tentative determination of the data type of each operation to the operation data type control instruction unit 123.

The data type modification unit 103 modifies the tentatively determined data type of each operation according to the processing time for the entire iteration. The data type modification unit 103 includes the individual value calculation unit 131 and the data type control unit 132.

The individual value calculation unit 131 receives an instruction to calculate the operation time taken to execute each operation included in one iteration and the conversion time taken to convert the operation data, from the management table creation instruction unit 122. Then, the individual value calculation unit 131 acquires the computation graph from the computation graph storage unit 107.

Next, the individual value calculation unit 131 calculates the operation time for each operation using a profiler, by executing the operation of each node in the computation graph using a value given in advance to calculate the operation time. In this case, the individual value calculation unit 131 uses both of the 32-bit floating-point number and the 8-bit fixed-point number as the values for calculating the operation time, to calculate the operation time when the 32-bit floating-point number is used and the operation time when the 8-bit fixed-point number is used. Here, the individual value calculation unit 131 regards the respective operations in the computation graph as different operations from each other. For example, even if operations are of the same type, the individual value calculation unit 131 treats these operations as different operations when the operations are executed at different timings in one iteration.

Figure 5:
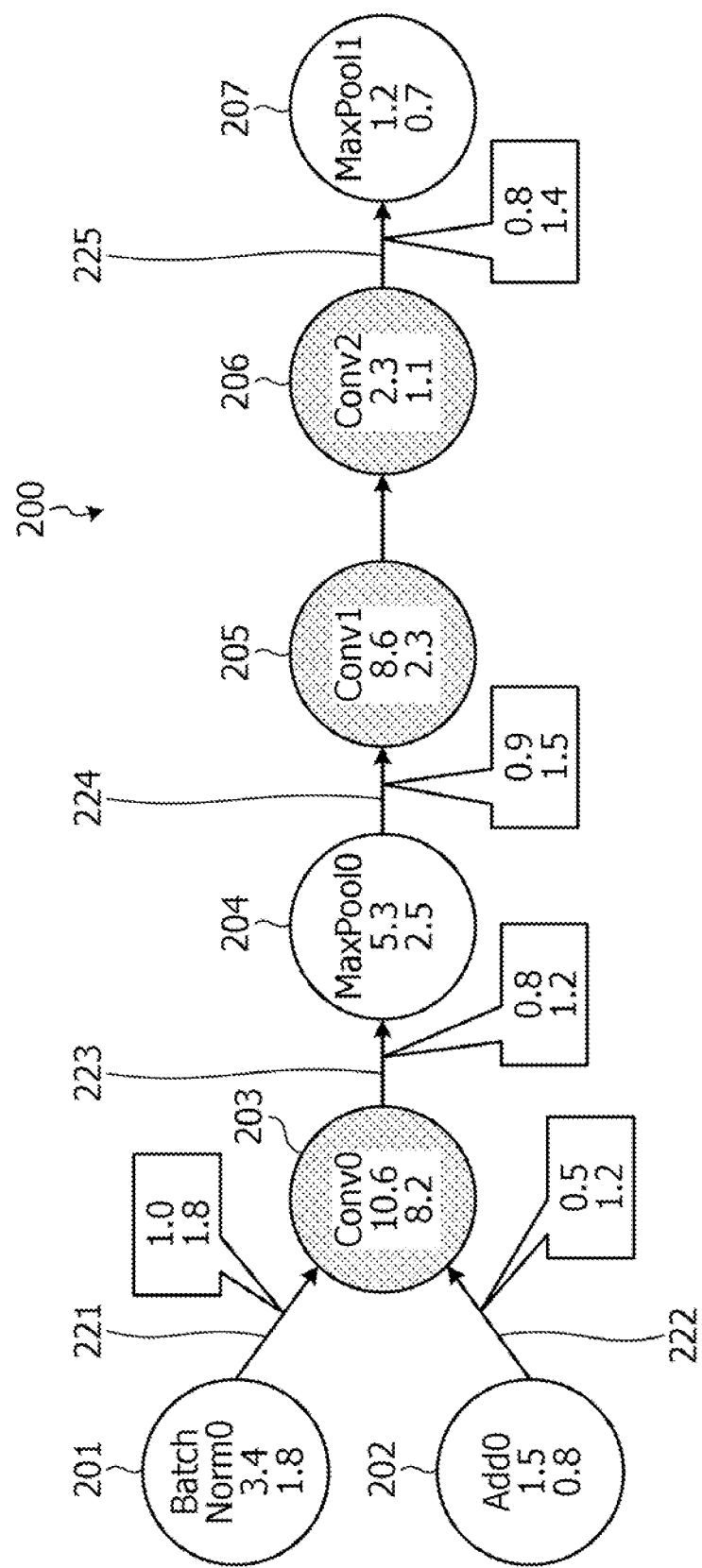
FIG. 5 is a diagram illustrating an example of operation times and conversion times.

In the case of the computation graph 200 illustrated in FIG. 4, the individual value calculation unit 131 calculates the operation time when the 32-bit floating-point number is used and the operation time when the 8-bit fixed-point number is used, for the respective operations performed in the nodes 201 to 207. For example, the individual value calculation unit 131 calculates the operation time for the operation used in each of the nodes 201 to 207, as illustrated in FIG. 5. FIG. 5 is a diagram illustrating an example of the operation times and the conversion times. In each of the nodes 201 to 207 in FIG. 5, the operation name, the operation time when the 32-bit floating-point number is used, and the operation time when the 8-bit fixed-point number is used are noted. The operation name is identification information assigned to uniquely identify each operation executed in the nodes 201 to 207.

Then, the individual value calculation unit 131 generates an operation time management table 211 illustrated in FIG. 6 in which the operation time when the 32-bit floating-point number is used and the operation time when the 8-bit fixed-point number is used are registered for each operation. FIG. 6 is a diagram representing an example of the operation time management table and a conversion time management table.

Next, the individual value calculation unit 131 calculates the conversion time when data conversion is performed between the respective nodes using data given in advance to calculate the operation time. In this case as well, the individual value calculation unit 131 calculates the conversion times for both of conversion from the 32-bit floating-point number to the 8-bit fixed-point number and conversion from the 8-bit fixed-point number to the 32-bit floating-point number.

For example, in the case of the computation graph 200 illustrated in FIG. 4, the individual value calculation unit 131 calculates the conversion time for conversion from the 32-bit floating-point number to the 8-bit fixed-point number for data type conversions 221 to 225, as illustrated in FIG. 5. Furthermore, the individual value calculation unit 131 calculates the conversion time for conversion from the 8-bit fixed-point number to the 32-bit floating-point number for the data type conversions 221 to 225. In FIG. 5, the conversion time for conversion from the 32-bit floating-point number to the 8-bit fixed-point number is noted in the upper part of the balloon attached to the arrow indicating each of the data type conversions 221 to 225, and the conversion time for conversion from the 8-bit fixed-point number to the 32-bit floating-point number is noted in the lower part of the balloon. Here, in the present embodiment, the individual value calculation unit 131 omits the calculation of the conversion time between operations for which the consistency in the data type has been determined. For example, since the nodes 205 and 206 in the computation graph 200 are requested to use the same data type, the individual value calculation unit 131 does not calculate the conversion time for the data conversion between the nodes 205 and 206.

Then, the individual value calculation unit 131 generates the conversion time management table 212 illustrated in FIG. 6 in which the conversion times for both of conversion from the 32-bit floating-point number to the 8-bit fixed-point number and conversion from the 8-bit fixed-point number to the 32-bit floating-point number are registered.

Thereafter, the individual value calculation unit 131 stores the operation time management table 211 in the management table storage unit 106. Furthermore, the individual value calculation unit 131 stores the conversion time management table 212 in the management table storage unit 106. Then, the individual value calculation unit 131 notifies the management table creation instruction unit 122 of the management table creation completion response.

Here, the individual value calculation unit 131 may calculate the operation time and the conversion time in advance using the profiler before receiving the deep learning execution command. Furthermore, the individual value calculation unit 131 may calculate the operation time and the conversion time for each operation beforehand using the properties of each operation determined by the tensor type, the type of operation, and parameters used in each operation.

Upon receiving a data type modification instruction from the operation data type control instruction unit 123, the data type control unit 132 acquires the operation time management table 211 and the conversion time management table 212 from the management table storage unit 106. Furthermore, the data type control unit 132 acquires the computation graph from the computation graph storage unit 107.

Here, the total processing time for one iteration is worked out by the sum of the operation times and the data type conversion times for the respective operations. For example, the tentative total processing time for one iteration is calculated by following mathematical formula (1).

$$C_{total}=C_{o8}+C_{o32}+C_{c8 \to 32}+C_{c32 \to 8} \quad (1)$$

Here, $C_{total}$ denotes the total processing time. Furthermore, $C_{o8}$ denotes the processing time summed for an operation group that performs operations with the 8-bit fixed-point number. In addition, $C_{o32}$ denotes the processing time summed for an operation group that performs operations with the 32-bit floating-point number. In addition, $C_{c8 \to 32}$ denotes the conversion time summed for data type conversions from the 8-bit fixed-point number to the 32-bit floating-paint number. In addition, $C_{c32 \to 8}$ denotes the conversion time summed for data type conversions from the 32-bit floating-point number to the 8-bit fixed-point number.

The data type control unit 132 makes a data type modification on the tentative data type so as to minimize the total processing time represented by above-mentioned mathematical formula (1). Here, as the data type conversion, the data type control unit 132 converts the data type used in consecutive operations using the same data type. Thus, the data type control unit 132 collectively clusters consecutive operations using the same data type in the computation graph. For example, the data type control unit 132 constructs a cluster with an interval between operations in which the data type is switched in the computation graph, as a boundary.

Figure 7:
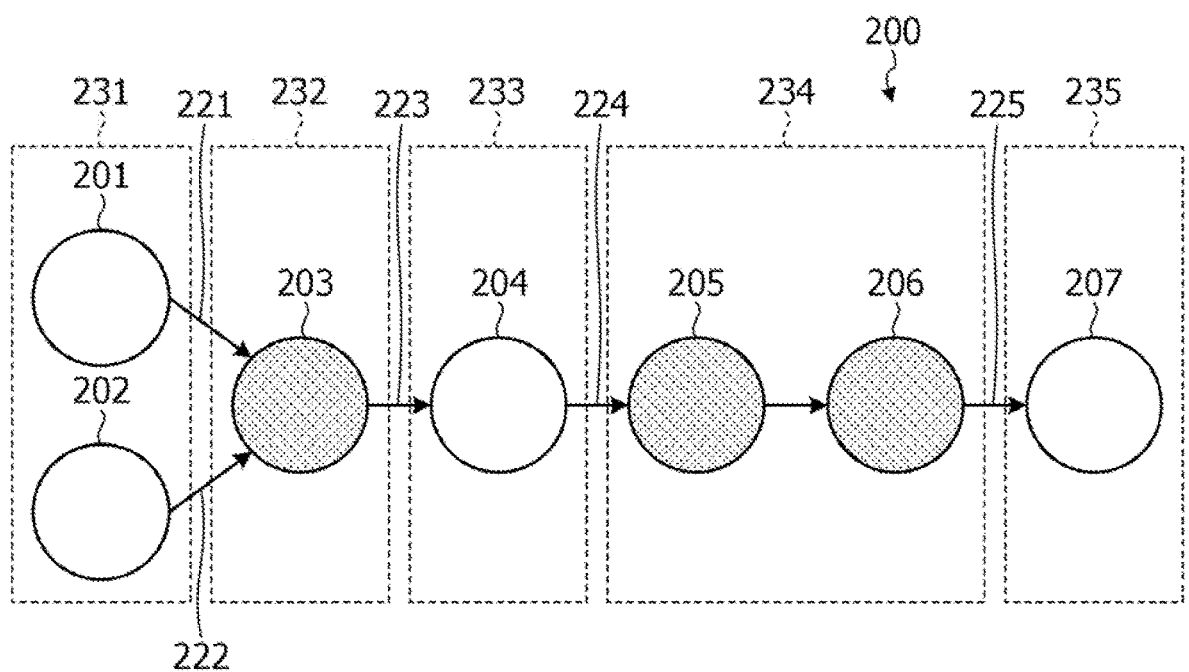
FIG. 7 is a diagram representing clustering of operations.

When the computation graph 200 illustrated in FIG. 4 is used, the data type control unit 132 clusters the operations of the respective nodes 201 to 207 as illustrated in FIG. 7. FIG. 7 is a diagram representing clustering of the operations. In this case, the data type control unit 132 generates a cluster 231 including the nodes 201 and 202, a cluster 232 including the node 203, a duster 233 including the node 204, a duster 234 including the nodes 205 end 206, and a duster 235 including the node 207.

Next, the data type control unit 132 specifies a duster that performs an operation using the 8-bit fixed-point number as the data type. For example, in the case of the computation graph in FIG. 4, the data type control unit 132 specifies the dusters 232 and 234 as clusters that perform operations using the 8-bit fixed-point number as the data type.

Next, the data type control unit 132 calculates the processing time of each specified duster when the 8-bit fixed-point number is used, using each value in the operation time management table 211 and the conversion time management table 212 in following mathematical formula (2). In this case, the data type control unit 132 includes the conversion time due to the data type conversion into the processing time when the 8-bit fixed-point number is used.

$$c_8 = \Sigma_N c_{i_8} + \Sigma_{N_i} c_{n_{32 \to 8}} + \Sigma_{N_o} c_{m_{8 \to 32}} \quad (2)$$

Here, $c_8$ denotes the processing time involved when the 8-bit fixed-point number is used for operations in the cluster. Furthermore, N denotes the number of operations included in the duster. In addition, $N_i$ denotes the number of tensors input to the cluster. In addition, $N_o$ denotes the number of tensors output from the cluster. In addition, $c_{i8}$ denotes the operation cost when an operation is performed with the 8-bit fixed-point number for an operation i. In addition, $c_{n_{32 \to 8}}$ denotes the conversion time taken to convert the data type from the 32-bit floating-point number to the 8-bit fixed-point number for an input n. In addition, $c_{m_{8 \to 32}}$ denotes the conversion time taken to convert the data type from the 8-bit fixed-point number to the 32-bit floating-point number for an input m.

Next, the data type control unit 132 calculates the processing time of each specified cluster when the 32-bit floating-point number is used, using each value in the operation time management table 211 and the conversion time management table 212 in following mathematical formula (3).

$$c_{32} = \Sigma_N c_{i_{32}} \quad (3)$$

Here, $c_{32}$ denotes the processing time involved when the 32-bit floating-point number is used for operations in the cluster. Furthermore, $c_{i32}$ denotes the operation cost when an operation is performed with the 32-bit floating-point number for an operation i.

Figure 8:
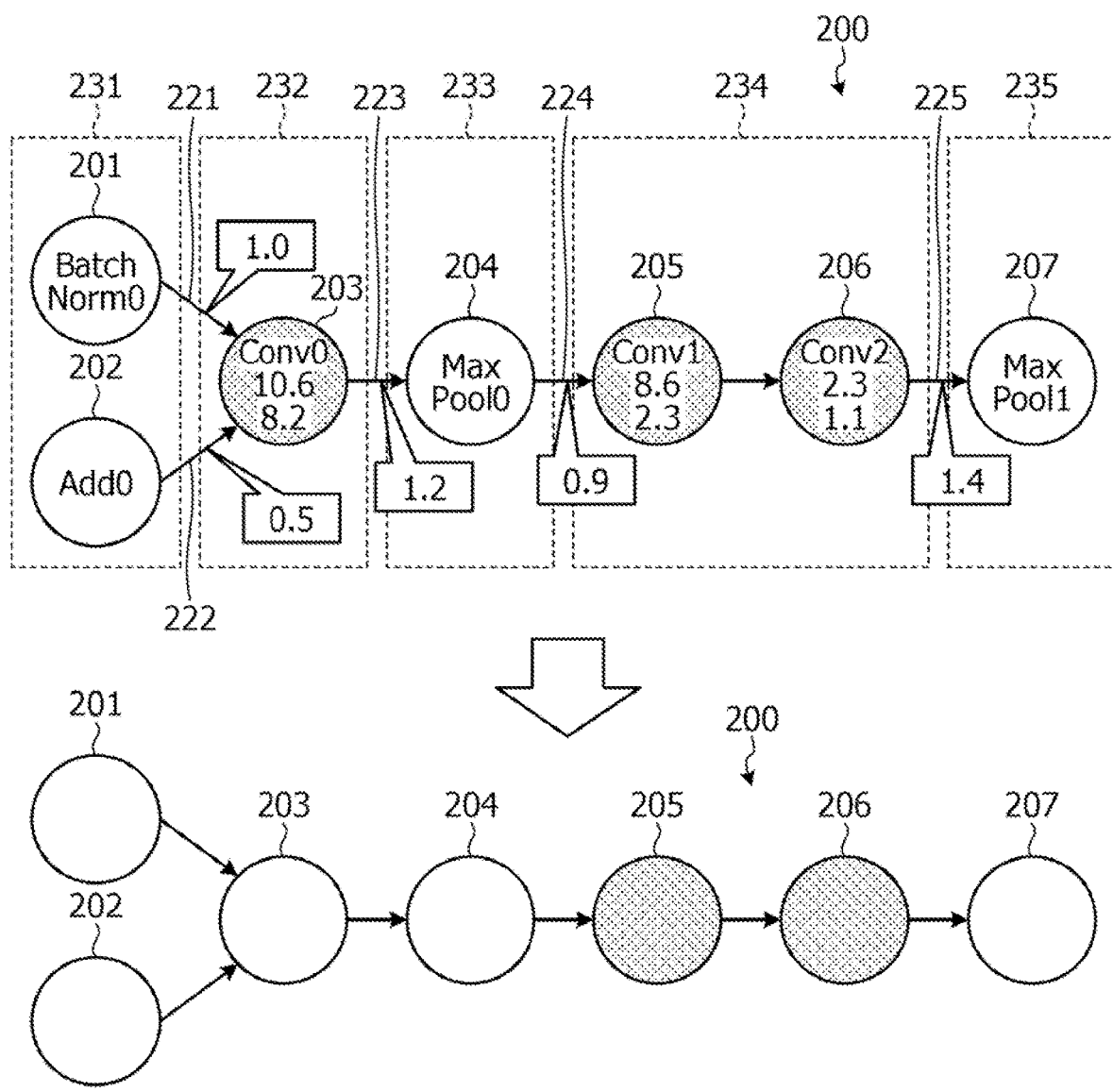
FIG. 8 is a diagram for explaining a modification of the data type of an operation in the computation graph.

Since the operation name is also registered together in each node in the computation graph, the data type control unit 132 makes a search for each operation time using the operation name as a key, and acquires each operation time from the operation time management table 211. In addition, as for the data type conversion between operations, the data type control unit 132 makes a search for data conversion between functions that matches when <data conversion source operation names>-<data conversion destination operation name> is used as a key, and acquires the data conversion from the conversion time management table 212. For example, the data type control unit 132 acquires the operation time for each operation and the data type conversion time, as illustrated in FIG. 8. FIG. 8 is a diagram for explaining a modification of the data type of an operation in the computation graph.

Next, the data type control unit 132 compares the processing time when the 8-bit fixed-point number is used and the processing time when the 32-bit floating-point number is used for each specified cluster. When the processing time when the 8-bit fixed-point number is used is equal to or longer than the processing time when the 32-bit floating-point number is used, the data type control unit 132 determines to return the data type of the relevant duster to the 32-bit floating-point number.

For example, the data type control unit 132 calculates the processing time of the cluster 232 in FIG. 8 when the 8-bit fixed-point number is used, as 1.0+0.5+1.2+8.2=10.9 ms. Furthermore, the data type control unit 132 calculates the processing time of the duster 232 when the 32-bit floating-point number is used, as 10.6 ms. In this case, since the processing time when the 8-bit fixed-point number is used is equal to or longer than the processing time when the 32-bit floating-point number is used, the data type control unit 132 determines to return the data type of the cluster 232 to the 32-bit floating-point number.

In addition, the data type control unit 132 calculates the processing time of the cluster 234 in FIG. 8 when the 8-bit fixed-point number is used, as 0.9+2.3+1.1+1.4=5.7 ms. Furthermore, the data type control unit 132 calculates the processing time of the cluster 234 when the 32-bit floating-point number is used, as 8.6+2.3=10.9 ms. In this case, since the processing time when the 8-bit fixed-point number is used is shorter than the processing time when the 32-bit floating-point number is used, the data type control unit 132 determines to maintain the data type of the cluster 234 to the 8-bit fixed-point number.

Next, the data type control unit 132 modifies the computation graph by modifying the data type to be used in each operation included in a cluster determined to return the data type to the 32-bit floating-point number, to the 32-bit floating-point number in the computation graph stored in the computation graph storage unit 107. With this process, the computation graph 200 is modified to the state illustrated in the lower part of FIG. 8 when viewed facing the page. Thereafter, the data type control unit 132 responds to the operation data type control instruction unit 123 with a notification of the conclusion for the data type. This 8-bit fixed-point number corresponds to an example of "first data type". Furthermore, the 32-bit floating-point number corresponds to an example of "second data type".

Figure 9:
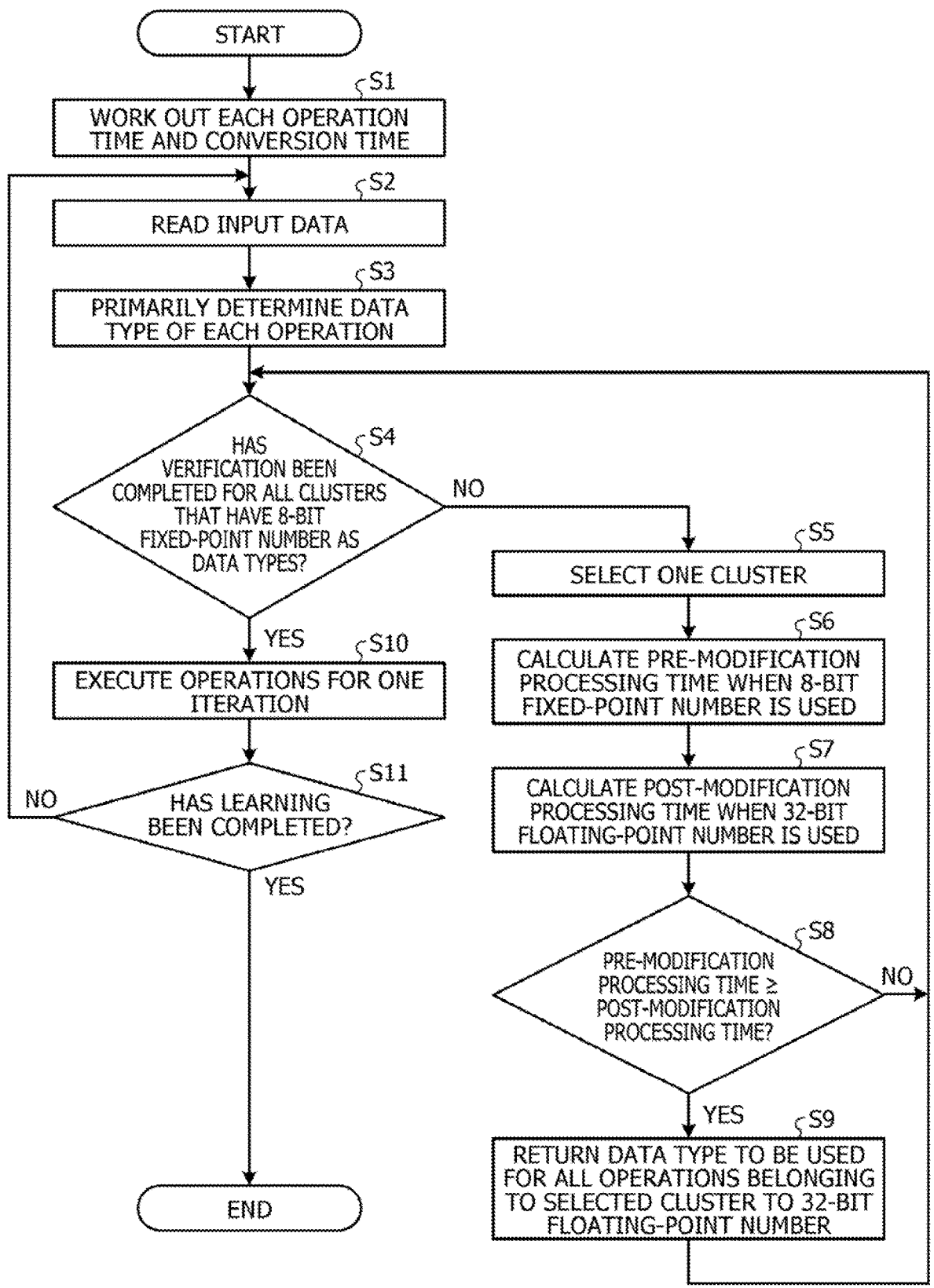
FIG. 9 is a flowchart of deep learning by the information processing device according to the embodiment.

Next, the flow of deep learning by the information processing device 1 according to the embodiment will be described with reference to FIG. 9. FIG. 9 is a flowchart of deep learning by the information processing device according to the embodiment.

The management table creation instruction unit 122 receives a deep learning execution instruction from the user application execution unit 20. Then, the management table creation instruction unit 122 instructs the individual value calculation unit 131 to create the management tables. The individual value calculation unit 131 executes each operation using a value given in advance, and works out the operation time of each operation and the conversion time of each data type using the profiler (step S1), Then, the individual value calculation unit 131 creates the operation time management table 211 and the conversion time management table 212, and stores the created management tables in the management table storage unit 106. Thereafter, the operation data type control instruction unit 123 notifies the operation instruction unit 121 of the completion of the creation of the management tables.

Upon receiving a notification of the completion of the creation of the management tables, the operation instruction unit 121 reads the input data (step S2). For example, the operation instruction unit 121 requests the data reading instruction unit 124. The data reading instruction unit 124 instructs the learning data reading unit 105 to read the learning data. The learning data reading unit 105 receives the instruction from the data reading instruction unit 124, and reads the learning data from the learning data memory unit 30. The data reading instruction unit 124 acquires the learning data from the learning data reading unit 105, and transfers the acquired learning data to the operation instruction unit 121.

Next, the operation instruction unit 121 instructs the operation data type control instruction unit 123 to determine the data type. The operation data type control instruction unit 123 receives the instruction from the operation instruction unit 121, and asks the primary data type determination unit 104 to primarily determine the data type. The primary data type determination unit 104 acquires the operation result from the operation unit 101, and works out the expressible ratio according to the 8-bit fixed-point number in the operation result. Furthermore, the primary data type determination unit 104 works out the fluctuation of each iteration, which represents variations in the expressible ratio. Then, the primary data type determination unit 104 primarily determines the data type of each operation based on the expressible ratio and the fluctuation (step S3). Thereafter, the primary data type determination unit 104 registers the primarily determined data type of each operation type in the computation graph contained in the computation graph storage unit 107.

Next, the operation data type control instruction unit 123 instructs the data type control unit 132 to modify the data type. The data type control unit 132 receives the instruction from the operation data type control instruction unit 123, and acquires the operation time management table 211 and the conversion time management table 212 from the management table storage unit 106. Furthermore, the data type control unit 132 acquires the computation graph in which the primarily determined data type is registered, from the computation graph storage unit 107. Next, the data type control unit 132 clusters the operations in the computation graph. Subsequently, the data type control unit 132 verifies whether or not the verification as to the data type modification has been completed for all dusters that have the 8-bit fixed-point number as the data types (step S4).

When there remains a cluster that has the 8-bit fixed-point number as the data type but has not been verified as to the data type modification (step S4: no), the data type control unit 132 selects one cluster from among clusters that have the 8-bit fixed-point number as the data types but have not been verified (step S5).

Next, the data type control unit 132 calculates a pre-modification processing time, which is the processing time when the 8-bit fixed-point number is used in the selected cluster (step S6).

Subsequently, the data type control unit 132 calculates a post-modification processing time, which is the processing time when the 32-bit floating-point number is used in the selected cluster (step S7).

Next, the data type control unit 132 verifies whether or not the pre-modification processing time is equal to or longer than the post-modification processing time (step S8). When the pre-modification processing time is shorter than the post-modification processing time (step S8: no), the data type control unit 132 returns to step S4.

On the contrary to this, when the pre-modification processing time is equal to or longer than the post-modification processing time (step S8: yes), the data type control unit 132 returns the data type to be used for all operations that are registered in the computation graph and belong to the selected cluster, to the 32-bit floating-point number (step S9). Thereafter, the data type control unit 132 returns to step S4.

On the other hand, when the verification as to the data type modification has been completed for all the clusters that have the 8-bit fixed-point number as the data types (step S4: yes), the operation data type control instruction unit 123 notifies the operation instruction unit 121 of the determination of the data type. The operation instruction unit 121 receives the notification of the data type determination, and executes the operations for one iteration using the computation graph stored in the computation graph storage unit 107 (step S10).

Next, the operation instruction unit 121 verifies whether or not learning has been completed depending on whether or not the predetermined condition is satisfied (step S11). When learning has not been completed (step S11: no), the operation instruction unit 121 returns to step S2.

On the contrary to this, when learning has been completed (step S11: yes), the operation instruction unit 121 notifies the operation unit 101 of the completion of learning, and ends the execution of deep learning.

Here, in the present embodiment, the 32-bit floating-point number and the 8-bit fixed-point number have been described as examples, but there may be a case where the 32-bit floating-point number and the 16-bit fixed-point number are used, or there may be a case where the 8-bit fixed-point number and the 16-bit fixed-point number are used. Besides, a combination of other data types may be employed as long as the operations have the data types with different accuracy and the processing time is sometimes shortened when the accuracy is increased.

As described above, in the information processing device according to the present embodiment, the data type to be used in each operation is primarily determined for each iteration based on the evaluation of the operation performance for the individual operations included in one iteration. Next, the information processing device dusters the operations, and specifies a duster in which the processing time becomes shorter when the 32-bit floating-point number is used than when the 8-bit fixed-point number is used. Subsequently, the information processing device modifies the data type to be used in operations belonging to the specified duster to the 32-bit floating-point number. Thereafter, the information processing device performs operations for each iteration using the modified data type of each operation. This may mitigate the disadvantage that the data type conversion time produced when some operations are switched from the 32-bit floating-point number to a less accurate data type makes the total processing time longer than the total processing time when the operations are performed with the 32-bit floating-point number. Consequently, the processing time for the entire machine learning may be kept short, and the efficiency of machine learning is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device of performing deep learning on a multilayer neural network model, comprising:
    a memory configured to store a computation graph representing a plurality of operations in an iteration of a plurality of iterations corresponding to the performing of the deep learning on the multilayer neural network model, the computation graph including a plurality of nodes and a plurality of edges connecting the plurality of nodes, each node of the plurality nodes representing an operation of the plurality of operations and including a numeric data type field for storing a numeric data type of numeric data to be used in the operation, each edge of the plurality of edges representing a data flow between two nodes of the plurality of nodes; and
    a processor coupled to the memory, the processor being configured to perform processing, the processing including:
    receiving training data to be used for the deep learning on the multilayer neural network, and
    training the multilayer neural network model by executing, a predetermined number of iterations, the plurality of operations in the computation graph stored in the memory using the training data, the training of the multilayer neural network model including:
    for each iteration of the predetermined number of iterations,
    allocating, for each node of the plurality of nodes in the computation graph, based on operation results of the each node in one or more iterations before the each iteration among the predetermined number of iterations, a first numeric data type or a second numeric data type more accurate than the first numeric data type, to the numeric data type of the numeric data to be used in the operation of the each node, the allocating of the numeric data type of the each node including:
        determining, based on the operation results of the each node, whether a decimal point position of the operation results in the each node in a case where the numeric data of the each node is expressed by the first numeric data type converges to a predetermined level,
        registering the first numeric data type into the numeric data type field of the each node in the computation graph stored in the memory when the decimal point position of the operation results in the each node is determined to have converged to the predetermined level, and
        registering the second numeric data type into the numeric data type field of the each node in the computation graph stored in the memory when the decimal point position of the operation results in the each node is not determined to have converged to the predetermined level;
    clustering, based on the numeric data type registered in the numeric data type field of each of the plurality of nodes, the plurality of nodes in the computation graph into one or more node groups each of which includes one or more nodes that are directly connected by one or more edges in the computation graph and that use a same numeric data type;

selecting, from among the one or more node groups, a modification target node group that includes one or more nodes in which the first numeric data type has been registered in the numeric data type field;

comparing, for the modification target node group, a first total processing time with a second total processing time, the first total processing time being a total processing time obtained by summing an operation time of each node in the modification target node group when the numeric data type of each node in the modification target node group is altered to the second numeric data type, the second total processing time being a total processing time obtained by summing an operation time of each node in the modification target node group when the numeric data type of each node in the modification target node group is the first numeric data type and a time period required to perform data conversions at an input and an output of the modification target node group, the data conversions at the input of the modification target node group being to convert the numeric data at the input of the modification target node group from the second numeric data type to the first numeric data type, the data conversions at the output of the modification target node group being to convert the numeric data at the output of the modification target node group from the first numeric data type to the second numeric data type;

performing modification processing based on a comparison result obtained by the comparing, the modification processing including: if a comparison result obtained by the comparing indicates that the first total processing time is equal to or shorter than the second total processing time, modifying the modification target node group in the computation graph by registering the second numeric data type to the numeric data type field of each node in the modification target node group; otherwise, retaining the first numeric data type for each node in the modification target node group; and executing the each iteration in the training of the multilayer neural network model using the training data, based on the respective numeric data types of the plurality of nodes in the computation graph after the modification processing.

2. The information processing device according to claim 1, wherein the memory is configured to store information that includes: the operation time when the first numeric data type is used, the operation time when the second numeric data type is used, and the time period required to perform the data conversions, and the first and second processing times are calculated using the information stored in the memory.

3. A machine learning method implemented by a computer of performing deep learning on a multilayer neural network model, the machine learning method comprising:

receiving training data to be used for the deep learning on the multilayer neural network, accessing a memory configured to store a computation graph representing a plurality of operations in an iteration of a plurality of iterations corresponding to the performing of the deep learning on the multilayer neural network model, the computation graph including a plurality of nodes and a plurality of edges connecting the plurality of nodes, each node of the plurality of nodes representing an operation of the plurality of operations and including a numeric data type field for storing a numeric data type of numeric data to be used in the operation, each edge of the plurality of edges representing a data flow between two nodes of the plurality of nodes, and training the multilayer neural network model by executing, a predetermined number of iterations, the plurality of operations in the computation graph stored in the memory using the training data, the training of the multilayer neural network model including:

for each iteration of the predetermined number of iterations, allocating, for each node of the plurality of nodes in the computation graph, based on operation results of the each node in one or more iterations before the each iteration among the predetermined number of iterations, a first numeric data type or a second numeric data type more accurate than the first numeric data type, to the numeric data type of the numeric data to be used in the operation of the each node, the allocating of the numeric data type of the each node including:

determining, based on the operation results of the each node, whether a decimal point position of the operation results in the each node in a case where the numeric data of the each node is expressed by the first numeric data type converges to a predetermined level, registering the first numeric data type into the numeric data type field of the each node in the computation graph stored in the memory when the decimal point position of the operation results in the each node is determined to have converged to the predetermined level, and registering the second numeric data type into the numeric data type field of the each node in the computation graph stored in the memory when the decimal point position of the operation results in the each node is not determined to have converged to the predetermined level;

clustering, based on the numeric data type registered in the numeric data type field of each of the plurality of nodes, the plurality of nodes in the computation graph into one or more node groups each of which includes one or more nodes that are directly connected by one or more edges in the computation graph and that use a same numeric data type;

selecting, from among the one or more node groups, a modification target node group that includes one or more nodes in which the first numeric data type has been registered in the numeric data type field;

comparing, for the modification target node group, a first total processing time with a second total processing time, the first total processing time being a total processing time obtained by summing an operation time of each node in the modification target node group when the numeric data type of each node in the modification target node group is altered to the second numeric data type, the second total processing time being a total processing time obtained by summing an operation time of each node in the modification target node group when the numeric data type of each node in the modification target node group is the first numeric data type and a time period required to perform data conversions at an input and an output of the modification target node group, the data conversions at the input of the modification target node group being to convert the numeric data at the input of the modification target node group from the second numeric data type to the first numeric data type, the data conversions at the output of the modification target node group being to convert the numeric data at the output of the modification target node group from the first numeric data type to the second numeric data type;

performing modification processing based on a comparison result obtained by the comparing, the modification processing including: if a comparison result obtained by the comparing indicates that the first total processing time is equal to or shorter than the second total processing time, modifying the modification target node group in the computation graph by registering the second numeric data type to the numeric data type field of each node in the modification target node group; otherwise, retaining the first numeric data type for each node in the modification target node group; and executing the each iteration in the training of the multilayer neural network model using the training data, based on the respective numeric data types of the plurality of nodes in the computation graph after the modification processing.

4. A non-transitory computer-readable storage medium storing a machine learning program which causes a computer to perform processing of performing deep learning on a multilayer neural network model, the processing comprising:

receiving training data to be used for the deep learning on the multilayer neural network, accessing a memory configured to store a computation graph representing a plurality of operations in an iteration of a plurality of iterations corresponding to the performing of the deep learning on the multilayer neural network model, the computation graph including a plurality of nodes and a plurality of edges connecting the plurality of nodes, each node of the plurality nodes representing an operation of the plurality of operations and including a numeric data type field for storing a numeric data type of numeric data to be used in the operation, each edge of the plurality of edges representing a data flow between two nodes of the plurality of nodes, and training the multilayer neural network model by executing, a predetermined number of iterations, the plurality of operations in the computation graph stored in the memory using the training data, the training of the multilayer neural network model including:

for each iteration of the predetermined number of iterations, allocating, for each node of the plurality of nodes in the computation graph, based on operation results of the each node in one or more iterations before the each iteration among the predetermined number of iterations, a first numeric data type or a second numeric data type more accurate than the first numeric data type, to the numeric data type of the numeric data to be used in the operation of the each node, the allocating of the numeric data type of the each node including:

determining, based on the operation results of the each node, whether a decimal point position of the operation results in the each node in a case where the numeric data of the each node is expressed by the first numeric data type converges to a predetermined level, registering the first numeric data type into the numeric data type field of the each node in the computation graph stored in the memory when the decimal point position of the operation results in the each node is determined to have converged to the predetermined level, and registering the second numeric data type into the numeric data type field of the each node in the computation graph stored in the memory when the decimal point position of the operation results in the each node is not determined to have converged to the predetermined level;

clustering, based on the numeric data type registered in the numeric data type field of each of the plurality of nodes, the plurality of nodes in the computation graph into one or more node groups each of which includes one or more nodes that are directly connected by one or more edges in the computation graph and that use a same numeric data type;

selecting, from among the one or more node groups, a modification target node group that includes one or more nodes in which the first numeric data type has been registered in the numeric data type field;

comparing, for the modification target node group, a first total processing time with a second total processing time, the first total processing time being a total processing time obtained by summing an operation time of each node in the modification target node group when the numeric data type of each node in the modification target node group is altered to the second numeric data type, the second total processing time being a total processing time obtained by summing an operation time of each node in the modification target node group when the numeric data type of each node in the modification target node group is the first numeric data type and a time period required to perform data conversions at an input and an output of the modification target node group, the data conversions at the input of the modification target node group being to convert the numeric data at the input of the modification target node group from the second numeric data type to the first numeric data type, the data conversions at the output of the modification target node group being to convert the numeric data at the output of the modification target node group from the first numeric data type to the second numeric data type;

performing modification processing based on a comparison result obtained by the comparing, the modification processing including: if a comparison result obtained by the comparing indicates that the first total processing time is equal to or shorter than the second total processing time, modifying the modification target node group in the computation graph by registering the second numeric data type to the numeric data type field of each node in the modification target node group; otherwise, retaining the first numeric data type for each node in the modification target node group; and executing the each iteration in the training of the multilayer neural network model using the training data, based on the respective numeric data types of the plurality of nodes in the computation graph after the modification processing.

\* \* \* \* \*